(No Model.)
F. W. KROGH.
WATER TANK.
No. 537,894. Patented Apr. 23, 1895.
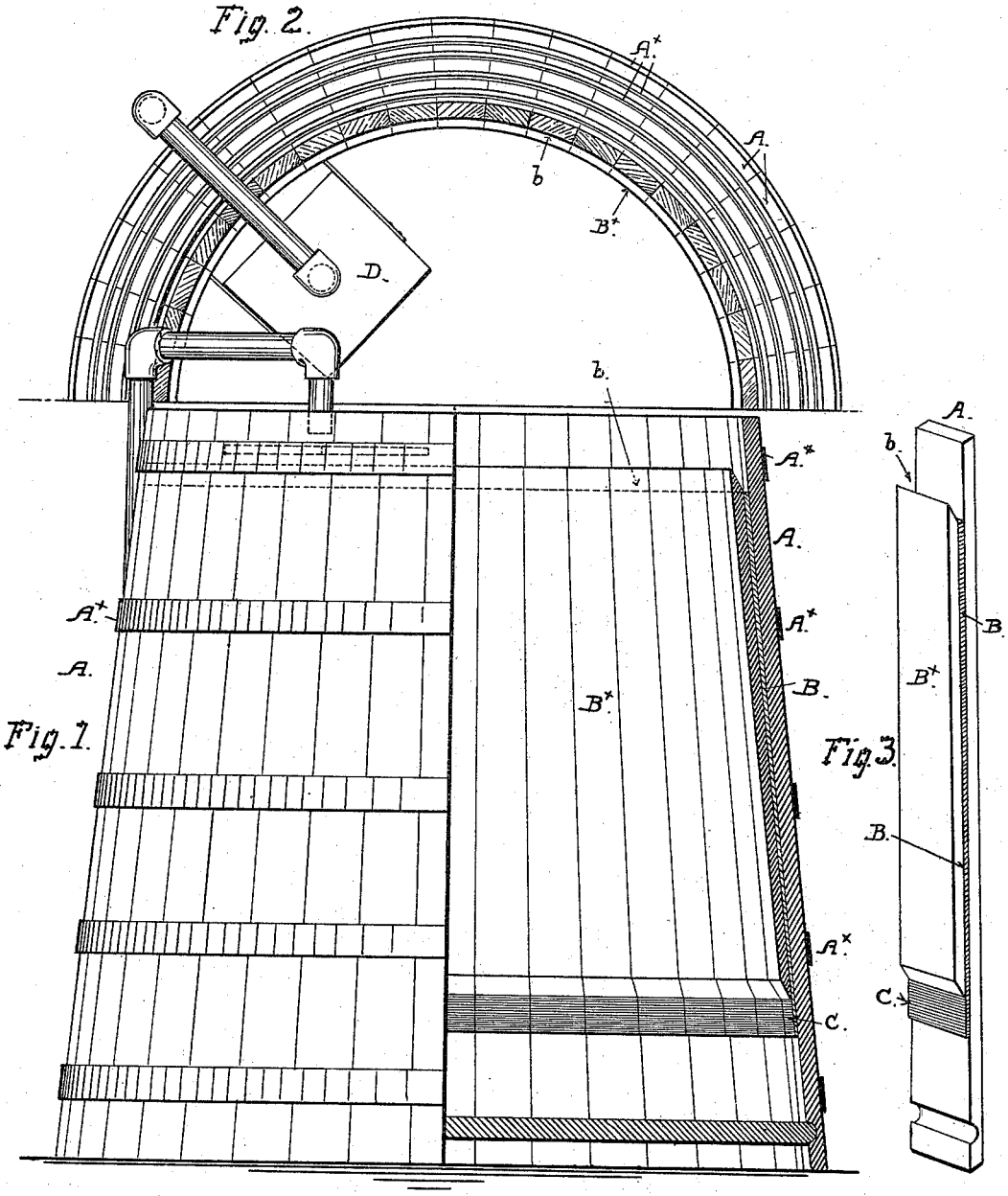
Witnesses:
M. Request
William Franklin
Inventor:
Ferdinand W. Krogh
By ........ Attys.

UNITED STATES PATENT OFFICE.

FERDINAND W. KROGH, OF SAN FRANCISCO, CALIFORNIA.

WATER-TANK.

SPECIFICATION forming part of Letters Patent No. 537,894, dated April 23, 1895.

Application filed April 12, 1893. Serial No. 470,060. (No model.)

*To all whom it may concern:*

Be it known that I, FERDINAND W. KROGH, a citizen of the United States, residing in the city and county of San Francisco, in the State of California, have invented a new and useful Improvement in Water-Tanks, of which the following is a specification.

This invention relates to tanks for holding and storing water in places exposed to the action of the sun and air, and has for its object to produce an improved tank wherein the staves will not shrink and the hoops become loose when the tank is only partially filled or when the water supply is discontinued for a long period of time.

My invention consists in a lining for the inside of the tank composed of some water or moisture absorbent such as bibulous paper over which is tacked a veneer of wood the upper edges of which is cut beveling. The water is admitted through a pipe from the top of the tank upon a splash-board which sprays the water against the sides of the tank and upper edges of the beveled veneering which is absorbed or taken up by the bibulous packing.

The accompanying drawings forming part of this specification illustrate the manner in which I have constructed and produced my improved tank, Figure 1 being an elevation one half in section. Fig. 2 is a one half plan or top view of Fig. 1. Fig. 3 is a perspective view of one of the staves looking at the inner side.

The wall or body of the tank is built of wooden staves A, A, suitably joined and bound together by hoops A$^\times$ in the ordinary way, to produce a cylindrical structure with more or less taper of the shape most generally employed, on the inside of the structure and against the inner surface of the staves is tacked bibulous paper or other moisture absorbent B and over this thin strips of veneer B$^\times$ which may be of the same width as that of the staves and arranged so as to cover and break the joints formed of the staves. Each strip of veneering is beveled inwardly and downwardly as at —*b*— to form a circumferential groove and retain the moisture conveyed by the splash-board for a greater period of time.

The veneering forms a continuous covering to the bibulous material from near the top of the tank down to the probable low-water mark as at C so that some portion of the absorbent will be always exposed to the action of the water contained in the tank and draw it upward by capillary attraction should the water be cut off from the supply pipe or be suspended for a period of time under which condition the splash-board would not convey water to the upper end of the absorbent lining and veneer of the tank.

The splash-board D is suspended within the tank on a line parallel or just above the upper inwardly bound edge of the veneering or wooden lining so that the water will be sprayed upon it at all points and be absorbed by the bibulous paper interposed between the staves and veneering or thin strips of wood forming the interior lining of the tank.

Having thus described my invention, what I claim, and desire to secure by Letters Patent, is—

1. A tank for storing water having its outer body of wood an inner lining of veneer beveled inwardly at the top edge and a bibulous interlining between the two bodies, as described.

2. The combination with a tank for storing water consisting of an inner and an outer body with a bibulous packing between the two bodies which is exposed at the top edge, of a splash-board suspended in the tank and adapted to splash the incoming water upon the exposed ends of the lining in the manner and for the purpose herein set forth.

In testimony that I claim the foregoing I have hereunto set my hand and seal.

FERDINAND W. KROGH. [L. S.]

Witnesses:
C. W. M. SMITH,
CHAS. E. KELLY.